Nov. 12, 1968   K. MAIERSHOFER   3,410,379

COIL CLUTCH WITH ONE-WAY BRAKE

Filed June 1, 1966

INVENTOR

KARL MAIERSHOFER

BY

*Mueller, Aichele & Rauner*

ATTYS.

United States Patent Office 3,410,379
Patented Nov. 12, 1968

3,410,379
COIL CLUTCH WITH ONE-WAY BRAKE
Karl Maiershofer, Park Ridge, Ill., assignor to Motorola, Inc., Franklin Park, Ill., a corporation of Illinois
Filed June 1, 1966, Ser. No. 554,482
2 Claims. (Cl. 192—12)

ABSTRACT OF THE DISCLOSURE

A spring clutch is maintained in a completely disengaged position by the use of a one-way brake on the output shaft to prevent energy stored in the spring clutch mechanism from causing reverse rotation of the output shaft.

---

In many mechanisms clutches are used to couple power from a prime mover to the mechanism. This is particularly advantageous if the mechanism is intermittently operated. A prime mover, such as an electric motor, will not start quickly and therefore it is necessary to keep the motor running at full speed and to use a clutch to couple and decouple the motor to the mechanism being driven. Clutches can be made to engage and disengage rapidly thus overcoming the limitations of the electric motor in starting and stopping.

One form of a clutch which is particularly useful for this purpose is the spring clutch. One end of a spring is fastened to a first member of the clutch and the spring is in frictional contact with a second member of the clutch to transmit power from one member to the other member of the clutch. To cause the clutch to disengage the free end of the spring is held by an actuating mechanism thereby changing the diameter of the spring to remove it from frictional contact with the second clutch member. When the actuating mechanism releases the spring it resumes its normal diameter and the clutch is engaged.

The spring clutch is particularly useful for mechanisms in which there is normally a long engagement period and a short disengagement period. In the usual form of the spring clutch, the clutch does not disengage completely and therefore during the disengagement period there is frictional contact between the spring and the second clutch member. While this frictional contact is not sufficient to transmit the power through the clutch, it causes excessive wear, shortening the life of the clutch mechanism. In applications where the engagement period is of short duration, and the clutch is normally disengaged, the usual form of the spring clutch is not suitable as it does not have sufficiently long life.

It is therefore an object of this invention to provide an improved form of a spring clutch mechanism.

Another object of this invention is to provide a spring clutch mechanism which will completely disengage.

A feature of this invention is the provision of a spring clutch mechanism including an actuating mechanism which may intermittently engage the spring to remove the spring from frictional contact with one member of the clutch.

Another feature of this invention is the provision of a one-way brake mechanism coupled to one member of the clutch to prevent reverse rotation of the said one clutch member after disengagement.

Figure 1:
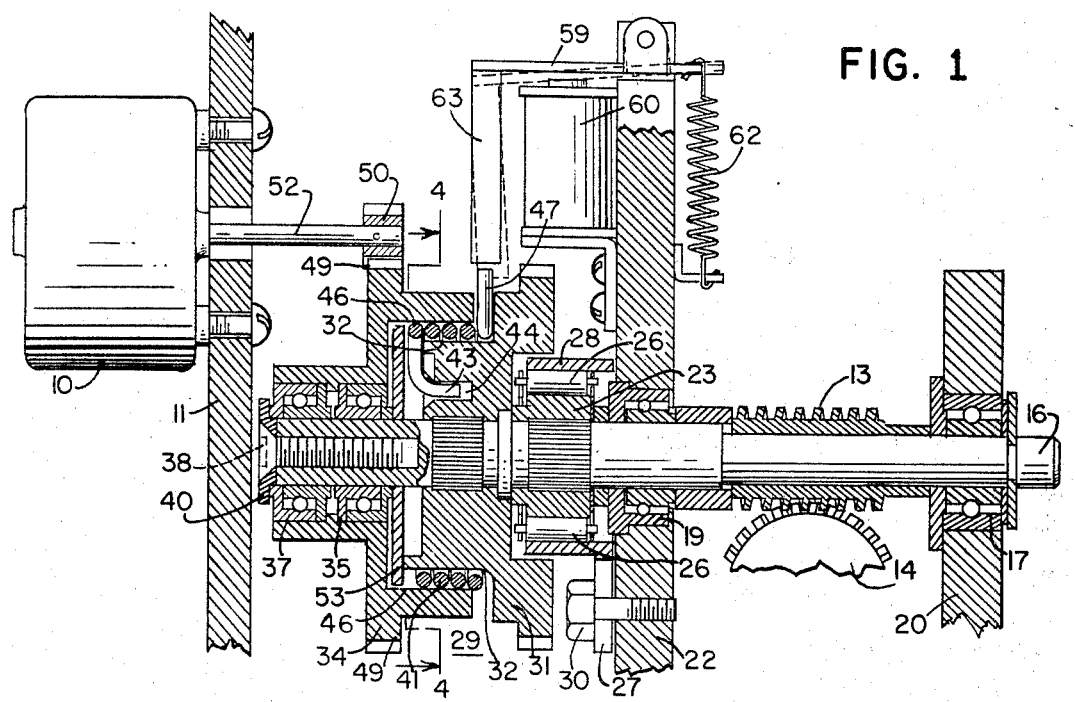
Figure 2:
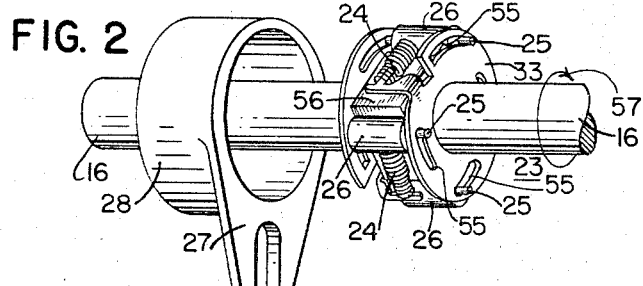
Figure 3:
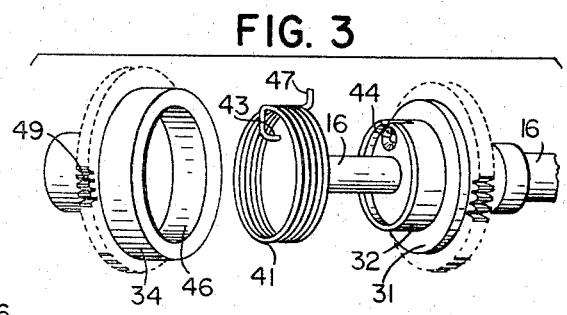
Figure 4:
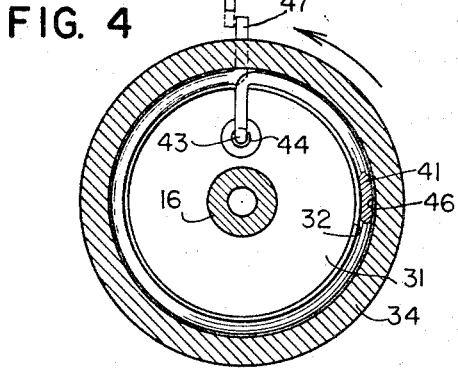

The invention is illustrated in the drawings of which:
FIG. 1 is a cross-sectional drawing of a clutch mechanism incorporating the features of this invention;
FIG. 2 is an exploded view of a one-way brake;
FIG. 3 is an exploded view of a spring clutch; and
FIG. 4 is a section view of the mechanism of FIG. 1.

In practicing this invention a clutch mechanism is provided having an input member adapted to be driven in rotary motion in a particular direction. A spring clutch couples the input member to an output member to cause the output member to rotate in the particular direction. Actuating means are provided to intermittently engage the spring clutch to uncouple the input and output members. A one-way brake mechanism is coupled to the output member to prevent rotation of the output member in a direction opposite to the particular direction, thereby maintaining the spring clutch in its completely disengaged position.

In a particular embodiment of the invention a spring clutch is provided having an output member with a cylindrical exterior surface. The spring is mechanically fastened to the output member and wrapped around the exterior surface. The input member of the clutch mechanism includes a cylindrical opening having an interior surface of greater diameter than the exterior surface. A spring is positioned between the interior surface of the input member and the exterior surface of the output member and is fastened to the output member. The spring is normally in frictional contact with interior surface of the input member so that power is transmitted from the input member to the output member.

One end of the spring is free and shaped to form a tang which extends outwardly of the clutch mechanism. An actuating mechanism is provided for intermittently engaging the tang portion of the spring. When the actuating mechanism engages the tang portion the spring is wound tightly around the exterior surface of the output member of the clutch and is removed from frictional contact with the interior surface of the input member, thus disengaging the clutch. A one-way brake mechanism is provided on the output member of the clutch mechanism for preventing the spring tension from causing the output member to rotate in a direction opposite to its normal direction of rotation. This maintains the spring in its tightly wound condition so that the clutch is completely disengaged.

Referring to FIG. 1 there is shown a cross-sectional view of a clutch mechanism incorporating the features of this invention. Motor 10 is rigidly mounted on supporting mounting member 11 and continuously rotates at a fixed speed. It is desired to transmit intermittently the output power of motor 10 to worm wheel 14 through worm 13 which is rigidly mounted on shaft 16. Shaft 16 is rotatably mounted on mounting members 20 and 22 by bearings 17 and 19. A one-way brake member 23 is rigidly secured to shaft 16 and includes rollers 26 and sleeve 28. Sleeve 28 is rigidly secured to mounting member 22 through arm 27 and retaining screw 30. The operation of one-way brake 23 will be described in a subsequent portion of the specification.

Referring to FIGS. 1 and 3, a clutch mechanism 29 is provided for intermittenly transmitting the output power of motor 10 to shaft 16. Spring clutch 29 includes an output member 31 rigidly fixed to shaft 16 and including an exterior surface 32. An input member 34, including an interior surface 46, is rotatably mounted on shaft 16 by bearings 35 and 37. Retaining screw 38 and retaining washer 40 maintain input member 34 in proper position on shaft 16.

A clutch spring 41 is provided and is positioned between interior surface 46 and exterior surface 32 of the clutch members. Spring 41 has one end 43 inserted into hole 44 of output member 31, so that spring 41 is mechanically connected to output member 31. The other end 47 of spring 41 is bent to form at tang which extends outwardly of members 34 and 31. Spring 41 is wound with a diameter so that in normal use it will expand outwardly against interior surface 46. The frictional contact between interior surface 46 and the spring 41 will provide a mechanical coupling between the input and output members. The direction of rotation of input member 34 is such that spring 41 tends to expand thus increasing the mechanical coupling between input member 34 and spring 41.

Referring to FIG. 2 there is shown an exploded view of one-way brake 23. One-way brake 23 includes a square portion 56 rigidly fastened to shaft 16. Rollers 26 have shafts 25 extending therefrom and retained in position by retaining member 33 having guide slots 55 for receiving shafts 25. Rollers 26 are positioned at one end of their guide slots by bias springs 24. With sleeve 28 enclosing rollers 26, shaft 16 is free to rotate in the direction shown by rotational arrow 57. With shaft 16 rotating in this direction, rollers 26 are moved against bias springs 24 to a central position on square portions 56 thus providing clearance between the rollers 26 and sleeve 28 so that shaft 16 rotates freely. It shaft 16 is rotated in a direction opposite to that shown by directional arrow 57, rollers 26 move to the ends of square portion 56 and wedge tightly against sleeve 28 to prevent further rotation. While a particular form of a one-way brake has been shown in FIG. 2, the invention is not limited to this form of brake. Any one-way brake which is suitable for this mechanism may be employed.

Referring again to FIGS. 1 and 4 there is shown a solenoid 60 having a lever arm 59 rotatably mounted on supporting member 22. Lever arm 59 is positioned with respect to solenoid 60 so that energization of solenoid 60 will move lever arm 59 downward against the action of bias spring 62. Attached to lever arm 59 is an actuating arm 63.

In normal operation, with solenoid 60 unenergized, actuating arm 63 is in the position shown by solid lines of FIGS. 1 and 4. The output power from motor 10 is transmitted through motor shaft 53, gear 50 to gear 49, which forms part of input member 34. Power is transmitted from input member 34 through spring 41, which is in frictional contact with interior surface 46 of input member 34. With solenoid 60 energized actuating arm 63 moves downward and engages tang 47 of spring 41 as shown by the dotted lines representing actuating arm 63. Rotation of spring clutch 29 is in a direction to cause spring 41 to wind around exterior surface 32 of output member 31. This removes the spring 41 from frictional contact with input member 34 so that power is no longer transmitted through clutch 29.

In a normal spring clutch of the type shown, the tension of spring 41 will cause shaft 16 to reverse rotation and spring 41 will partially unwind so that there is a residual frictional contact between interior surface 46 and spring 41. While this contact will not cause rotation of output member 31, since it is held in position by actuating arm 63 holding tang 47 of spring 41, the frictional contact will be sufficient to cause excessive wear of spring 41 and the interior surface 46. This wear will cause premature failure of clutch 29.

In order to prevent reverse rotation of shaft 16, a one-way brake 23 is used. One-way brake 23 prevents reverse rotation of shaft 16 and therefore spring 41 is maintained under sufficient tension so that it will not unwind and contact interior surface 46. Thus, input member 34 will turn freely with clutch 29 disengaged to prevent excessive clutch wear.

De-energizing solenoid 60 causes actuating arm 63 to return to its normal position releasing tang 47 of spring 41. With tang 47 released, spring 41 unwinds so that it will again contact interior surface 46 causing the clutch mechanism to become engaged. Since spring 41 is maintained under greater tension than is possible in the normal clutch mechanism, it will operate more rapidly thus causing the clutch to engage more quickly.

Thus, an improved spring clutch has been shown which is particularly useful in devices where the clutch is engaged for short periods of time and disengaged for a relatively long period of time. By using a one-way brake in conjunction with the normal spring clutch the clutch mechanism is maintained in a completely disengaged position and the higher spring tension during disengagement causes a more rapid engagement of the clutch mechanism.

I claim:

1. A clutch mechanism, including in combination, a shaft, an input member rotatably mounted on said shaft and having an opening therein with a cylindrical interior surface, said input member including first gear means mounted thereon, an electric motor having second gear means engaging said first gear means for driving said input member in a particular direction at a fixed rotational speed, an output member fastened to said shaft and having a cylindrical portion with an exterior surface smaller in diameter than said opening in said input member, said output member having said cylindrical portion positioned within said opening with said exterior surface being concentric with said interior surface, spring means wrapped around said exterior surface and positioned between said interior and exterior surfaces, said spring means having a first end mechanically connected to said output member and a second end shaped to form a tang extending outwards of said input and output members, said spring means being wound in said particular direction so as to expand against said interior surface whereby rotation of said input member is transmitted to said output member and said shaft, one-way brake means mounted on said shaft whereby said shaft and said output member are constrained to rotate in only said particular direction, actuating means for intermittently engaging said tang and preventing rotation of said spring means and said output member, the rotation of said input member in said particular direction with said actuating means engaging said tang, acting to compress said spring means against said exterior surface and free from said interior surface, said one-way brake means acting to prevent reverse rotation of said shaft and said output member whereby said spring means is maintained free from said interior surface.

2. The clutch mechanism of claim 1 including, clutch support means, bearing means rotatably mounting said shaft on said clutch support means, said one-way brake means including a first portion fastened to said shaft and a second portion surrounding said first portion and fastened to said clutch support means, said first and second portions cooperating to permit rotation of said shaft in said particular direction and to prevent rotation of said shaft in a direction opposite to said particular direction.

References Cited

UNITED STATES PATENTS

| 1,255,547 | 2/1918 | Maynard | 192—26 |
| 2,298,970 | 10/1942 | Russell et al. | 192—26 X |
| 2,751,773 | 6/1956 | Woodson | 192—12 X |
| 3,232,399 | 2/1966 | Harned et al. | 192—12 X |
| 3,277,986 | 10/1966 | Beare | 192—12 X |
| 3,337,015 | 8/1967 | Wagner | 192—12 X |

BENJAMIN W. WYCHE III, *Primary Examiner.*